United States Patent [19]
Koyanagi et al.

[11] Patent Number: 5,891,234
[45] Date of Patent: Apr. 6, 1999

[54] SPIN ON GLASS MATERIAL AND METHOD FOR FORMING A SEMICONDUCTOR DEVICE BY USING IMPROVED SPIN ON GLASS MATERIAL

[75] Inventors: Kenichi Koyanagi; Koji Kishimoto; Tetsuya Homma, all of Tokyo, Japan

[73] Assignee: NEC Corporation, Tokyo, Japan

[21] Appl. No.: 619,086

[22] Filed: Mar. 21, 1996

[30] Foreign Application Priority Data

Mar. 22, 1995 [JP] Japan ..................................... 7-087650

[51] Int. Cl.⁶ ................................................. C09D 183/04
[52] U.S. Cl. ......................................................... 106/287.16
[58] Field of Search ......................................... 106/287.16

[56] References Cited

U.S. PATENT DOCUMENTS 5,271,768 12/1993 Morishima et al. ............... 106/287.16
5,472,488 12/1995 Allman ................................ 106/287.16
5,496,402 3/1996 Sakamoto et al. ................. 106/287.16

OTHER PUBLICATIONS

CA 111:105916, Miura et al, "Optical information recording media", Feb. 17, 1989.
CA 126:41301, Kaynagi et al, "SOG material and manufacture of semiconductor device", Jan. 11, 1996.
CA 105:71386, Hoshino et al, "Silicon oxide coating on magnetic disk", Mar. 22, 1986.

Primary Examiner—David Brunsman
Attorney, Agent, or Firm—Young & Thompson

[57] ABSTRACT

A spin on glass composition which includes in a solvent as a main component alkoxysilane represented by $H_nSi(OR)_{4-n}$, where n is 1, 2, or 3 and R is an alkyl group. Water or alcohol is available as a solvent. It is preferable to add the above alkoxysilane with at least any one of a phosphorus compound, boron compound and a germanium compound. It is also preferable to add the above alkoxysilane not only with tetraalkoxysilane $Si(OR)_4$, where R is an alkyl group, but also with at least any one of phosphorus compound, boron compound and germanium compound.

18 Claims, 7 Drawing Sheets

SPIN ON GLASS MATERIAL AND METHOD FOR FORMING A SEMICONDUCTOR DEVICE BY USING IMPROVED SPIN ON GLASS MATERIAL

BACKGROUND OF THE INVENTION

The present invention relates to an improved spin on glass material having an excellent burying property and capability of preventing generations of cracking and cavities, and further relates to a method for applying an improved spin on glass material for fabricating a semiconductor multilevel interconnection structure.

As recent requirement for increase in the density of integration of LSI circuits has been on the increase, differences in level of a surface of the LSI circuit device has also been enlarged. In this circumstances, how to realize planarization of the LSI circuit device has been now a very important issue for obtaining improvement in the density of the integration of LSI circuits.

A further recent requirement has been of how to obtain an improvement in high speed performance of LSI circuits. In order to satisfy this requirement, it is necessary to reduce an interconnection resistance of a gate electrode and a sheet resistance of source/drain regions. For the purpose of obtaining those required reductions, it is effective to provide either a titanium silicide thin film or a cobalt silicide thin film on the gate electrode and on the source/drain diffusion regions.

It is disclosed in 1982 IEEE IEDM, pp. 714–717 to use a self aligned silicide technique for forming a the above titanium silicide thin film or cobalt silicide thin film on the gate electrode and on the source/drain diffusion regions. This method can reduces the sheet resistances of the gate electrode and the source/drain diffusion regions. In this case, a boron phosphate silicate glass film may be used as an inter-layer insulator. The phosphorus containing insulator is useful to prevent heavy metals such as Na from arriving the surface of the semiconductor layer or substrate. The use of the phosphorus containing insulator was essential in the prior art of LSI technique.

The conventional method for forming the inter-layer insulator will be described with reference to FIGS. 1A through 1D, wherein a boron phosphate silicate glass film is used as an inter-layer insulator. With reference to FIG. 1A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4. A titanium silicide film 8 is selectively formed on the source and drain diffusion regions 5 and 6 as well as on the gate electrode 4.

With reference to FIG. 1B, a silicon oxide film 9 is deposited on an entire surface of the device by a normal pressure chemical vapor deposition method using monosilane and oxygen.

With reference to FIG. 1C, tetraethokythysilane, triethylborate, trimethylphosphate and oxygen are used for a low pressure chemical vapor deposition method to a boron phosphate silicate glass film 16 on an entire surface of the silicon oxide film 9. The deposited boron phosphate silicate glass film has a large difference in level on the surface. When the aspect ratio is large, it may be difficult to obtain a complete burying with the boron phosphate silicate glass film. For this reason, it is likely caused that the deposited boron phosphate silicate glass film has cavities. The large difference in level of the surface of the deposited boron phosphate silicate glass makes it difficult to obtain fine patterns of the interconnections on the boron phosphate silicate glass. If the interconnections are formed on the boron phosphate silicate glass film having the cavities and subsequently the boron phosphate silicate glass film is heated up and cooled down, then airs confined in the cavities are expanded and compressed. As a result, the interconnections formed on the boron phosphate silicate glass film having the cavities receive stresses when the airs confined in the cavities are expanded and compressed. In order to solve those problems, it is effective to subject the boron phosphate silicate glass film having the cavities to the reflow process at a high temperature to exclude the cavities therefrom.

With reference to FIG. 1D, for the above reasons, the surface of the deposited boron phosphate silicate glass film 16 is planerized. The deposited boron phosphate silicate glass film 16 is then reflowed in nitrogen atmosphere at a high temperature of not less than 850° C. to exclude cavities therefrom. The temperature in the reflow process is required to be not less than 850° C. If, however, the boron phosphate silicate glass is subjected to the reflow process at such high temperature, then a cohesion of the titanium silicide film 8 is caused whereby a resistance of the cohered titanium nitride film 17 is increased. In order to prevent this cohesion of the titanium nitride film 8, it is required to reduce the temperature of the reflow process down to not more than 800° C. If, however, the reflow process were carried out at the temperature not more than 800° C. so as to prevent any cohesion of the titanium silicide film 8, then the cavities still remain in the boron phosphate silicate glass film 16.

Alternatively, it has been proposed to use the spin on glass film as a part of the inter-layer insulator. The spin on glass material may be prepared by hydrolyzing and dehydrating tetraalkoxysilane. The conventional method for forming the spin on glass film as the inter-layer insulator will be described hereafter with reference to FIGS. 2A through 2C. With reference to FIG. 2A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4. A titanium silicide film 8 is selectively formed on the source and drain diffusion regions 5 and 6 as well as on the gate electrode 4.

With reference to FIG. 2B, a normal pressure chemical vapor deposition method is carried out using monosilane, phosphorus and oxygen as source gases to deposit a phospho silicate glass film on an entire surface of the device. The deposited phospho silicate glass film is reflowed to planerlize the surface of the deposited phospho silicate glass film thereby resulting in a planerized phospho silicate glass film being obtained. The above reflow process is carried out at a temperature of 900° C. in the nitrogen atmosphere. In this reflow process, a cohesion of the titanium silicide film 8 is caused to form a cohered titanium silicide film 17 having a high receptivity.

With reference to FIG. 2C, a spin on glass material is applied on the phospho silicate glass film. The spin on glass material applied is then buried to form a first spin on glass film 20. Further, the spin on glass material is again applied on the first spin on glass film 20 and then buried to form a second spin on glass film 21 on the first spin on glass film 20. Sets of such applications of the spin on glass material and subsequent burning processes are repeated until when the desired thickness of the spin on glass films laminated is obtained.

As described above, the spin on glass material is prepared by the hydrolyzation and dehydration of tetraalkoxysilane to form the spin on glass film. However, this spin on glass film is likely generated with cracking. A critical thickness of each of the spin on glass films is 200 nanometers for suppressing the generation of cracking. Plural sets of applications of the phospho silicate glass material and subsequent reflow processes and burring thereof are repeated until the desired thickness is obtained. This results in a complicated fabrication process.

Further, as described above, the reflow process and the burring process are carried out at a high temperature of 900° C. Such high temperature heat treatment causes the cohesion of the titanium silicide film 8 whereby the cohered titanium silicide film is formed, which has a high resistivity.

As described in the Japanese laid-open patent application No. 4-10418, the spin on glass material may be prepared from alkoxysilane which is represented by the general formula of $R_n Si(OR^*)_{4-n}$, where R and R* are alkyl groups of one or more carbon atoms, aryl groups of one or more carbon atoms, or vinyl groups of one or more carbon atoms, and n is the integer of 1–3. Further, as disclosed in the Japanese laid-open patent application No. 2-233531, there is available as the spin on glass material $Si(OH)_4$ or $Si(OC_2H_5)_4$ added with germanium. In those cases, the heat treatments may be carried out at a lower temperature than those described above. However, in the dehydration process, a large variation in volume of the spin on glass film is caused. Such large variation in volume of the spin on glass film causes cracking therein. Moreover the repeat of the silicon on glass material application and subsequent reflow and burring processes makes the fabrication process complicated.

In the above circumstances, it had been required to develop a novel spin on glass material free from the above problems and disadvantages.

SUMMARY OF THE INVENTION

Accordingly, it is an object of the present invention to provide a novel spin on glass material showing an excellent property of burying in a trench of high aspect ratio.

It is a further object of the present invention to provide a novel spin on glass material capable of preventing any generation of cavity in forming a spin on glass film.

It is a furthermore object of the present invention to provide a novel spin on glass material allowing a formation of a spin on glass film by a low temperature heat treatment.

It is a moreover object of the present invention to provide a novel spin on glass material allowing a formation of a spin on glass film having an excellent property as an inter-layer insulator.

It is a still object of the present invention to provide a novel spin on glass material facilitating a formation of a spin on glass film having a planerized surface.

It is a yet further object of the present invention to provide a novel spin on glass material which matches to a refractory metal silicide technique.

It is another object of the present invention to provide a method for forming an inter-layer insulator by using a novel spin on glass material showing an excellent property of burying in a trench of high aspect ratio.

It is further another object of the present invention to provide a method for forming an inter-layer insulator by using a novel spin on glass material capable of preventing any generation of cavity in forming the spin on glass film.

It is still another object of the present invention to provide a method for forming an inter-layer insulator by using a novel spin on glass material by a low temperature heat treatment.

It is yet another object of the present invention to provide a method for forming an inter-layer insulator having an excellent property by using a novel spin on glass material.

It is additional object of the present invention to provide a method for forming an inter-layer insulator having a planerized surface a novel spin on glass film which matches to a refractory metal silicide technique.

The above and other objects, features and advantages of the present invention will be apparent from the following descriptions.

The present invention provides a spin on glass material which includes in a solvent as a main component alkoxysilane represented by $H_n Si(OR)_{4-n}$, where n is 1, 2, 3 and R is alkyl group. Water or alcohol is available as a solvent. It is preferable to add the above alkoxysilane with at least any one of phosphorus compound, boron compound and germanium compound. It is also preferable to add the above alkoxysilane not only with tetraalkoxysilane $(Si(OR)_4$, where R is alkyl group but also with at least any one of phosphorus compound, boron compound and germanium compound.

The present invention provides a method for forming a spin on glass film on a silicon oxide film. A precursor solvent is prepared, which includes alkoxysilane represented by $H_n Si(OR)_{4-n}$, where n is 1, 2, 3 and R is alkyl group. The precursor solvent is applied on a silicon oxide film and then subjected to a heat treatment at a temperature of not more than 400° C. to form a spin on glass film covering the silicon oxide film. The spin on glass film is further subjected to a heat treatment at a temperature of not more than 800° C.

Water or alcohol is available as a solvent. It is preferable to add the above alkoxysilane with at least any one of phosphorus compound, boron compound and germanium compound. It is also preferable to add the above alkoxysilane not only with tetraalkoxysilane $Si(OR)_4$, where R is alkyl group but also with at least any one of phosphorus compound, boron compound and germanium compound.

BRIEF DESCRIPTIONS OF THE DRAWINGS

Preferred embodiments according to the present invention will be described in detail with reference to the accompanying drawings.

DISCLOSURE OF THE INVENTION

The present invention provides a spin on glass material which includes in a solvent as a main component alkoxysilane represented by $H_nSi(OR)_{4-n}$, where n is 1, 2, 3 and R is alkyl group. Water or alcohol is available as a solvent. It is preferable to add the above alkoxysilane with at least any one of phosphorus compound, boron compound and germanium compound. It is also preferable to add the above alkoxysilane not only with tetraalkoxysilane $Si(OR)_4$, where R is alkyl group but also with at least any one of phosphorus compound, boron compound and germanium compound.

The present invention provides a method for forming a spin on glass film on a silicon oxide film. A precursor solvent is prepared, which includes alkoxysilane represented by $H_nSi(OR)_{4-n}$, where n is 1, 2, 3 and R is alkyl group. The precursor solvent is applied on a silicon oxide film and then subjected to a heat treatment at a temperature of not more than 400° C. to form a spin on glass film covering the silicon oxide film. The spin on glass film is further subjected to a heat treatment at a temperature of not more than 800° C.

Water or alcohol is available as a solvent. It is preferable to add the above alkoxysilane with at least any one of phosphorus compound, boron compound and germanium compound. It is also preferable to add the above alkoxysilane not only with tetraalkoxysilane $(Si(OR)_4$, where R is alkyl group but also with at least any one of phosphorus compound, boron compound and germanium compound.

Figure 1A:
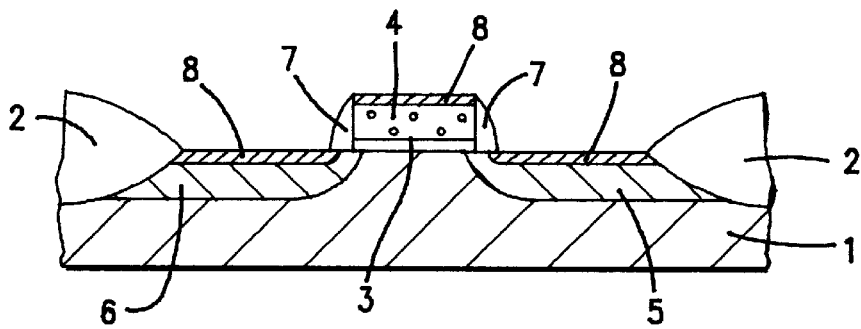
FIGS. 1A through 1D are fragmentary cross sectional elevation views illustrative of semiconductor devices covered by an inter-layer insulator made of a boron phosphate silicate glass film in sequential processes involved in the conventional fabrication method.
Figure 1B:
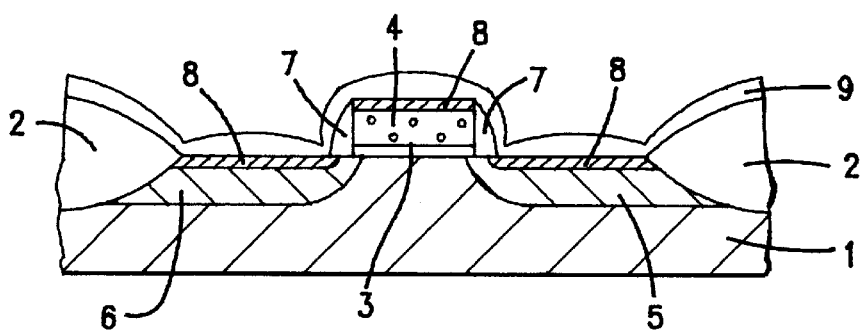
Figure 1C:
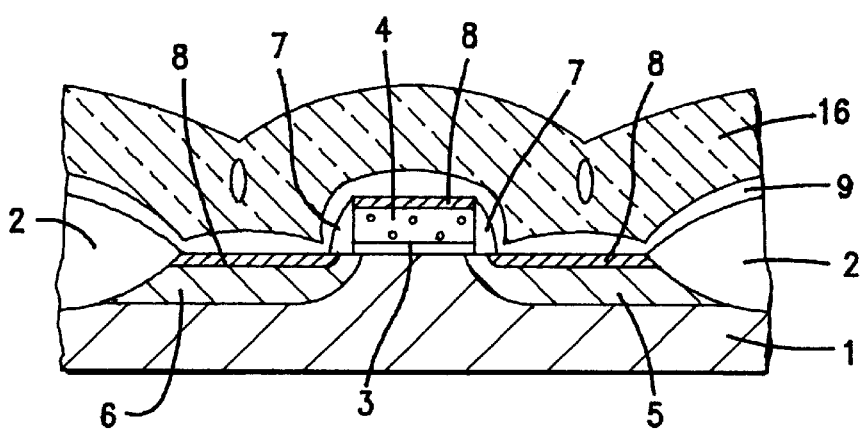
Figure 1D:
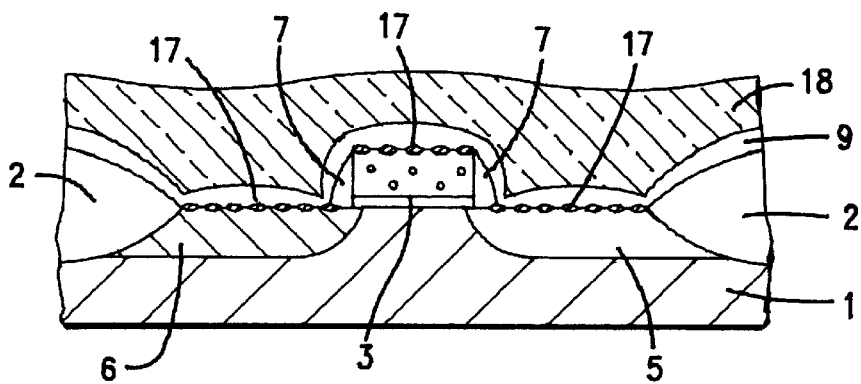
Figure 2A:
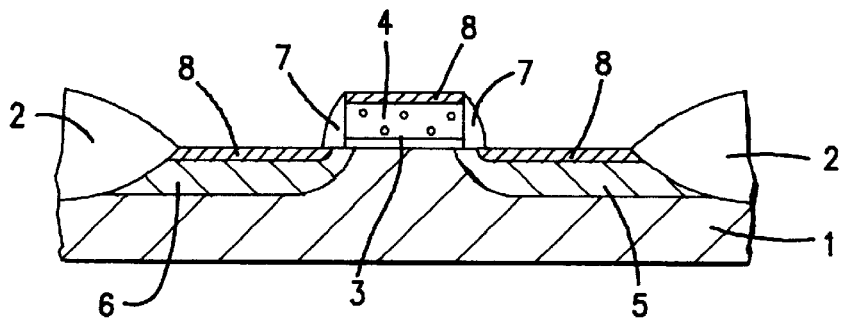
FIGS. 2A through 2C are fragmentary cross sectional elevation views illustrative of semiconductor devices covered by an inter-layer insulator made of a phospho silicate glass film in sequential processes involved in the other conventional fabrication method.
Figure 2B:
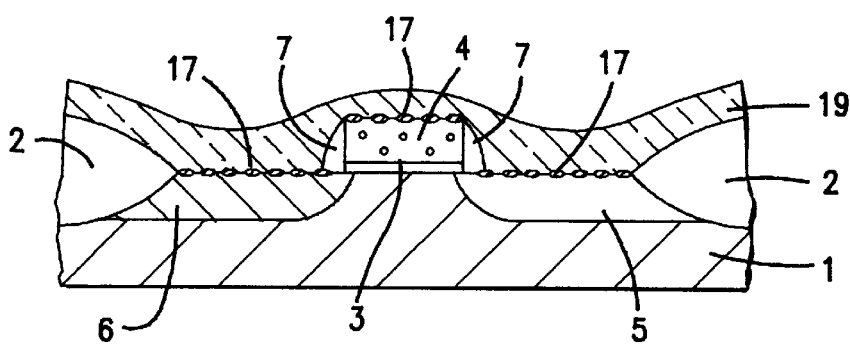
Figure 2C:
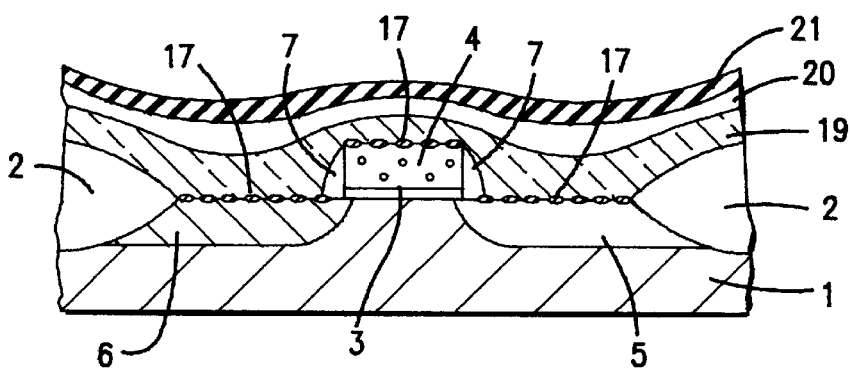
Figure 3:
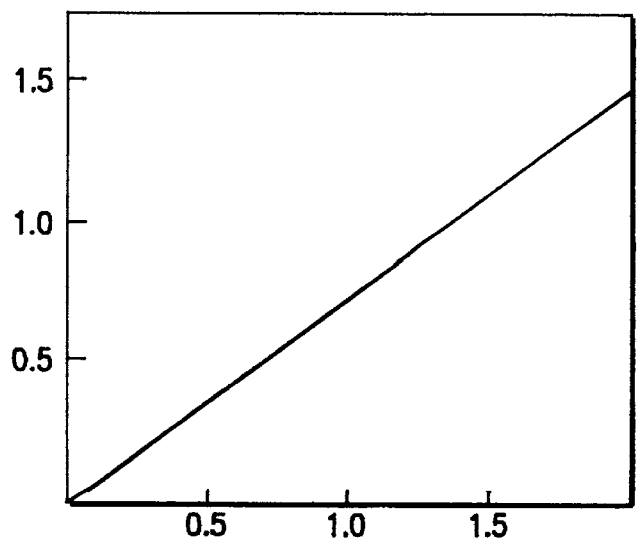
FIG. 3 is a diagram illustrative of a difference in level of a surface of a spin on glass film versus a difference in level of a surface of a substrate on which the spin on glass film is formed according to the present invention.

FIG. 3 is a diagram illustrative of a difference in level of a surface of a spin on glass film versus a difference in level of an uneven surface of a substrate on which the spin on glass film is formed, wherein the spin on glass film is made of a spin on glass material prepared from alkoxysilane represented by $H_nSi(OR)_{4-n}$, where n is 1, 2, 3 and R is alkyl group. FIG. 3 illustrates that the difference in level of the surface of the spin on glass film is reduced by 25% from the difference in level of the surface of the substrate. It may be available to add the above spin on glass material with the phosphorus compound such as tolualkoxy-phosphate represented by $PO(OR)_3$, where R is alkyl group. Alternatively, it may be available to add the above spin on glass material with the boron compound such as tolualkoxy-borate represented by $B(OR)_3$, where R is alkyl group. It may be also available to add the above spin on glass material with the germanium compound such as tolualkoxy-germanium represented by $Ge(OR)_4$, where R is alkyl group. Further, it may be available to add the spin on glass material the above phosphorus compound, the above boron compound and the germanium compound alone or in combination thereof. If the spin on glass material includes any of the above phosphorus compound, the above boron compound and the germanium compound, then a silica network is strained whereby a glass transition temperature is reduced. Other phosphorus compounds, boron compounds and germanium compounds may be added to the above spin on glass material as long as such compounds are hydroxide or organic compounds as well as soluble in the solvent of the spin on glass material.

There is a relative relationship between the glass transition temperature and the reflow temperature. If the spin on glass material includes at least any one of the phosphorus compounds, boron compounds and germanium compounds then the effect of the reflow of the spin on glass material is increased whereby the difference in level of the surface of the spin on glass film is reduced. It was confirmed that if the spin on glass material is added with phosphorus at 7 percents by weight and germanium at 20 percents by weight then the difference in level of the surface of the spin on glass film is reduced 30 percent as compared when no additive is included therein.

The above novel spin on glass material prepared according to the present invention is suitable for completely burying any fine patterns. It was confirmed that the above novel spin on glass material, which was prepared according to the present invention, buries without any cavity the apertures between interconnections where a pitch of the interconnections is 0.1 micrometers and a ratio of the height of the interconnections to the pitch is 2.0 as well as where the above novel spin on glass material was subjected to a heat treatment in nitrogen atmosphere at a temperature of 800° C. for 30 minutes. This demonstrates that the above novel spin on glass material may be available at least when the aspect ratio is not larger than 2.0. By contrast, the conventional spin on glass material as described above buries without any cavity the aperture between interconnections where a pitch of the interconnections is 0.1 micrometers and a ratio of the height of the interconnections to the pitch is 1.2 or less provided that the above novel spin on glass material was subjected to a heat treatment in nitrogen atmosphere at a temperature of 800° C. for 30 minutes. This demonstrates that the conventional spin on glass material as described above is not available when the aspect ratio is not larger than 1.2.

Figure 4:
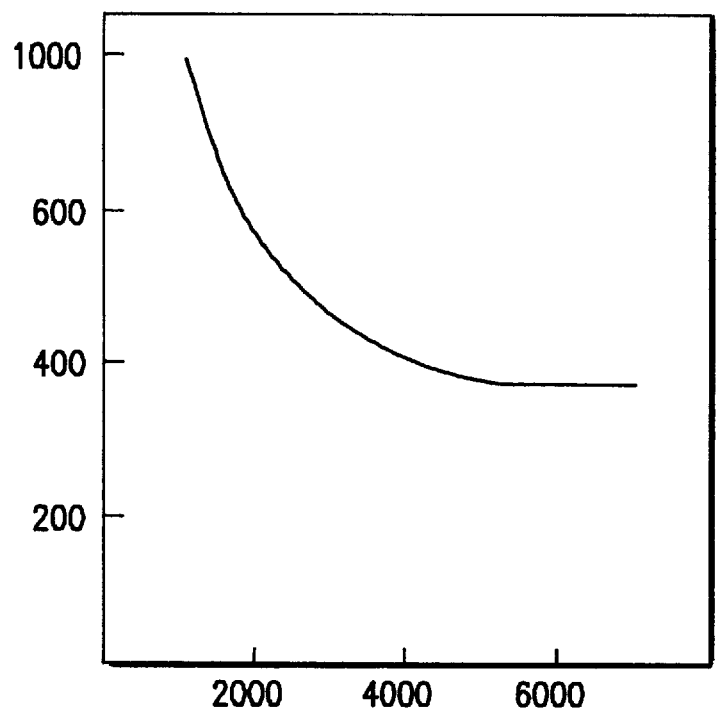
FIG. 4 is a diagram illustrative of a relationship of a thickness of a spin on glass film versus a rate of rotation according to the present invention.

FIG. 4 illustrates a relationship of a thickness of the spin on glass film versus the rotation rate of the spin on glass coating process. It can be understood that the thickness of the spin on glass film depends upon the rate of rotation. If the rate of rotation is increased, then the thickness of the spin on glass film is decreased. If, however, the rate of rotation is decreased, then the thickness of the spin on glass film is increased. This mean that the thickness of the spin on glass film is controllable by controlling the rate of rotation. It was confirmed that when the above novel spin on glass material is used then it is possible to grow the spin on glass film without any generation of cracking until the thickness of the spin on glass film becomes 1 micrometer. Alkoxysilane used in the present invention includes Si—H bonding, for which reason the above novel spin on glass material shows a smaller variation volume in dehydration process as compared to the conventional spin on glass film. This small variation in volume of the spin on glass film contributes to suppress any generation of cracking when the spin on glass film is grown by a single set of application of the spin on glass material and subsequent baking.

Figure 5:
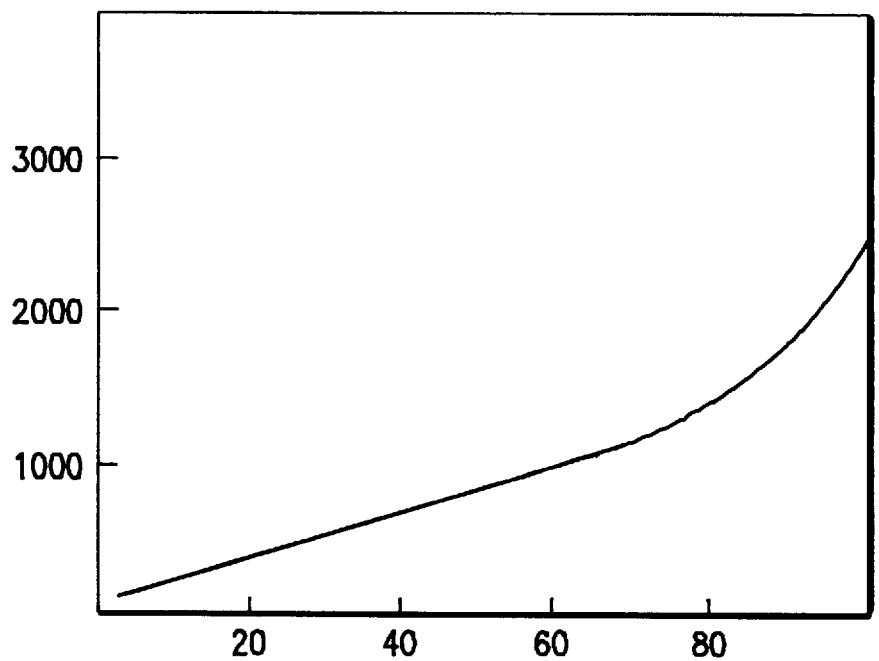
FIG. 5 is a diagram illustrative of a relationship of an Si—H absorption coefficient versus a ratio in percent by weight of alkoxysilane to tetraalkoxysilane.

It is preferable to add tetraalkoxysilane $Si(OR)_4$, where R is alkyl group, to alkoxysilane represented by $H_nSi(OR)_{4-n}$, where n is 1, 2, 3 and R is alkyl group. If tetraalkoxysilane is not added to alkoxysilane, then a heat treatment at a temperature of 800° C. or higher is required to form the spin on glass film with a silica glass structure without, however, any Si—H bonding structure. If, however, tetraalkoxysilane is added to alkoxysilane, then the necessary temperature of the heat treatment to be subjected to the spin on glass material is reduced. FIG. 5 illustrates an absorption coefficient of Si—H bonding in the spin on glass film, which is measured by the infrared spectroscopic analysis versus a ratio by weight of alkoxysilane to tetraalkoxysilane in the spin on glass material when the heat treatment is carried out at a low temperature of 400° C. From FIG. 5, it can be understood that when the amount of tetraalkoxysilane added is increased, then the absorption coefficient of the Si—H bonding is increased. Further, the necessary temperature of the heat treatment for forming the spin on glass film with a silica glass structure without any Si—H bonding structure is reduced. If an excess amount of tetraalkoxysilane is added to alkoxysilane, then there is increased possibilities of forming cavities and generation of cracking in the spin on glass film. In view of preventing formations of cavities and cracking, it is preferable that the ratio by weight of tetraalkoxysilane to alkoxysilane is not more than 50%, and more preferably the ratio by weight of tetraalkoxysilane to alkoxysilane should be not more than 30%.

The above novel spin on glass material is suitable for burying the aperture with a small width and a high aspect ratio without any cavity, for which reason the above novel spin on glass material is responsible for forming the LSI circuits with fine patterns. The above novel spin on glass material is further capable of preventing any generation of cracking. The above novel spin on glass material allows the spin on glass film by a single set of the application process and subsequent baking process whereby the number of fabrication processes is reduced. The addition of phosphorus compound, boron compound and germanium compound allows the reduction of the necessary temperature of the heat treatment. This allows the titanium silicide film to be used, wherein the use of the titanium silicide film improves in the high speed performance and in the density of the integration of the LSI circuits.

EMBODIMENTS

Figure 6A:
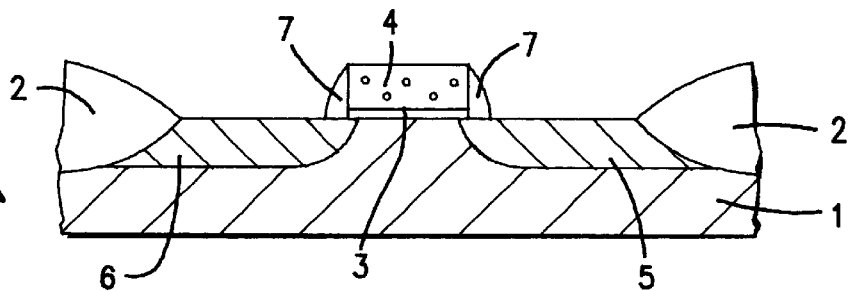
FIGS. 6A through 6C are fragmentary cross sectional elevation views illustrative of semiconductor devices covered by a spin on glass film involved in a fabrication method thereof in a first embodiment according to the present invention.

A first embodiment according to the present invention will be described in detail with reference to FIGS. 6A through 6C. With reference to FIG. 6A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4.

Figure 6B:
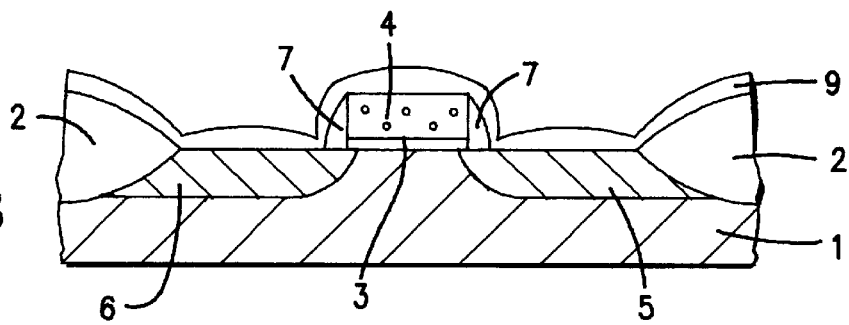

With reference to FIG. 6B, a silicon oxide film 9 having a thickness of 10 nanometers is deposited on an entire surface of the device by a normal pressure chemical vapor deposition method using monosilane and oxygen at a temperature, for example, 400° C.

Figure 6C:
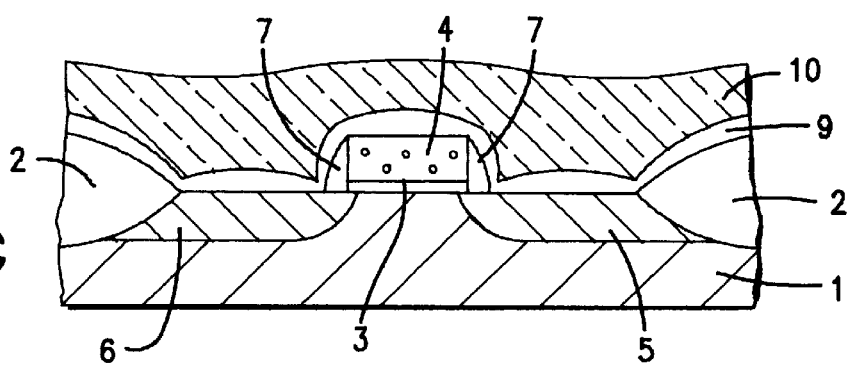

With reference to FIG. 6C, a spin on glass material was prepared from ethoxysilane represented by the chemical formula of $H_3Si(OC_2H_5)$. The spin on glass material was then applied on the silicon oxide film during a rotation of the wafer at a rotation rate of 4000 rpm until the thickness of the spin on glass material becomes approximately 400 nanometers. After this application process, the wafer was subjected to a heat treatment at a temperature of 150° C. for 1 minutes in nitrogen atmosphere on a hot plate in order to volatile the solvent into which ethoxysilane was dissolved. Further, the wafer was subjected to a heat treatment at a temperature of 400° C. for 60 minutes in nitrogen atmosphere in order to form the spin on glass film made of ethoxysilane represented by the chemical formula of $H_3Si(OC_2H_5)$. Furthermore, the wafer was subjected to a heat treatment at a temperature of 800° C. for 30 minutes in nitrogen atmosphere in order to bake the spin on glass material, to thereby form a spin on glass film 10.

It was confirmed that a difference in level of the surface of the spin on glass film 10 is smaller by 25% than the difference in level of the surface of the silicon oxide film 9. It was also confirmed that the spin on glass material buries, without any cavity by a single application process, an aperture between interconnections having a pitch of 0.2 micrometers, wherein the aspect ratio is 1.5.

Figure 7A:
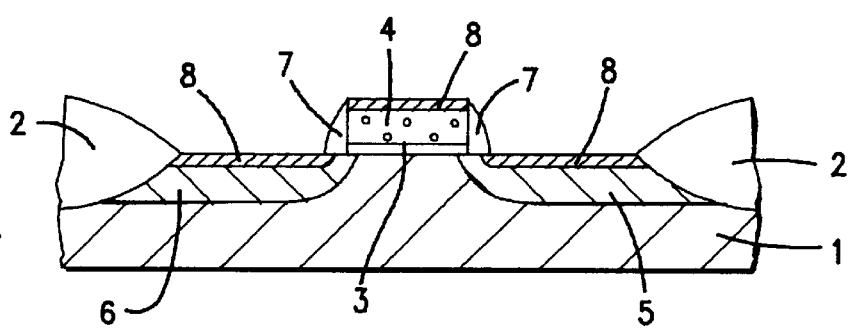
FIGS. 7A through 7C are fragmentary cross sectional elevation views illustrative of semiconductor devices covered by a spin on glass film involved in a fabrication method thereof in a second embodiment according to the present invention.

A second embodiment according to the present invention will be described in detail with reference to FIGS. 7A through 7C. With reference to FIG. 7A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4. A titanium silicide film 8 is selectively formed on the source and drain diffusion regions 5 and 6 as well as on the gate electrode 4.

Figure 7B:
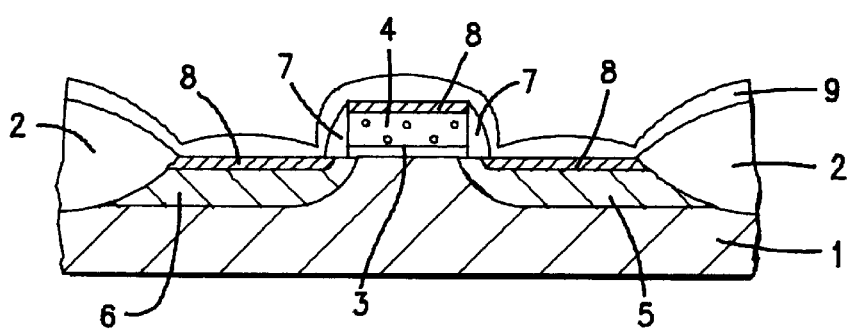

With reference to FIG. 7B, a silicon oxide film 9 having a thickness of 10 nanometers is deposited on an entire surface of the device by a normal pressure chemical vapor deposition method using monosilane and oxygen at a temperature, for example, 400° C.

Figure 7C:
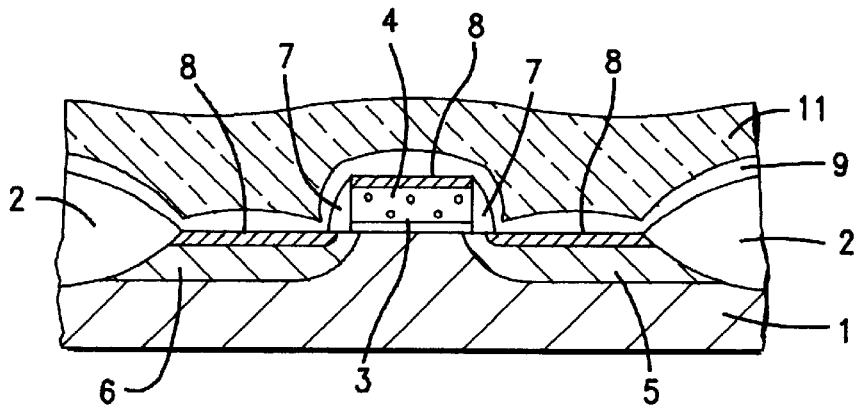

With reference to FIG. 7C, a spin on glass material was prepared from ethoxysilane represented by the chemical formula of $H_3Si(OC_2H_5)$ and added with trimethoxyphosphate represented by the chemical formula of $PO(OCH_3)_3$, wherein an amount of the trimethoxyphosphate was so determined that a concentration of phosphorus is 7 percents by weight. This spin on glass material was then applied on the silicon oxide film during a rotation of the wafer at a rotation rate of 4000 rpm until the thickness of the spin on glass material becomes approximately 400 nanometers. After this application process, the wafer was subjected to a heat treatment at a temperature of 150° C. for 1 minutes in nitrogen atmosphere on a hot plate in order to volatile the solvent into which ethoxysilane was dissolved. Further, the wafer was subjected to a heat treatment at a temperature of 400° C. for 60 minutes in nitrogen atmosphere in order to form the spin on glass film made of ethoxysilane represented by the chemical formula of $H_3Si(OC_2H_5)$ added with trimethoxyphosphate represented by the chemical formula of $PO(OCH_3)_3$. Furthermore, the wafer was subjected to a heat treatment at a temperature of 800° C. for 30 minutes in nitrogen atmosphere in order to bake the spin on glass material, to thereby form a spin on glass film 11 with no Si—H bonding.

It was confirmed that a difference in level of the surface of the spin on glass film 10 is smaller by 25% than the difference in level of the surface of the silicon oxide film 9. It was also confirmed that the spin on glass material buries, without any cavity by a single application process, an aperture between interconnections having a pitch of 0.2 micrometers, wherein the aspect ratio is 1.5.

Figure 8A:
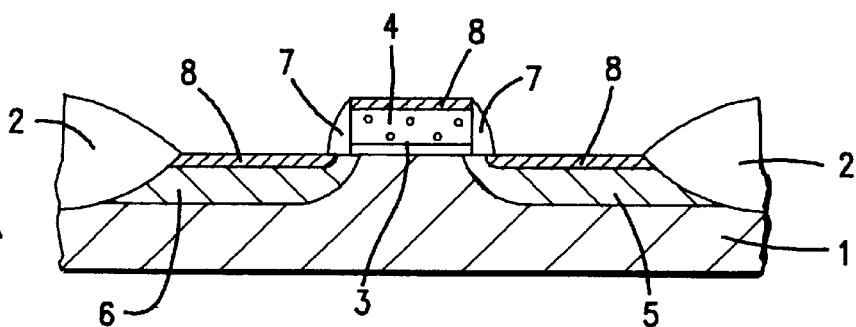
FIGS. 8A through 8C are fragmentary cross sectional elevation views illustrative of semiconductor devices covered by a spin on glass film involved in a fabrication method thereof in a third embodiment according to the present invention.

A third embodiment according to the present invention will be described in detail with reference to FIGS. 8A through 8C. With reference to FIG. 8A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4. A titanium silicide film 8 is selectively formed on the source and drain diffusion regions 5 and 6 as well as on the gate electrode 4.

Figure 8B:
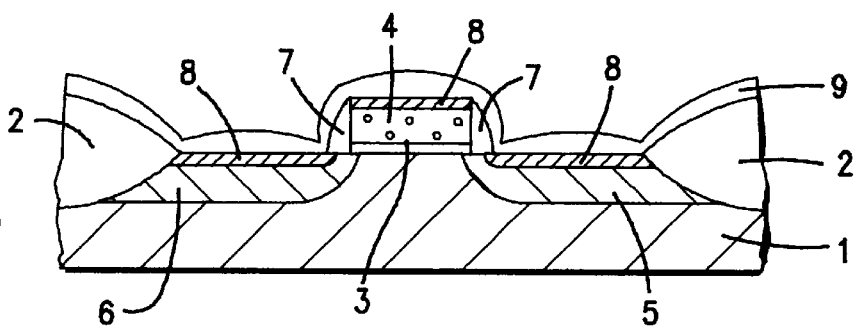

With reference to FIG. 8B, a silicon oxide film 9 having a thickness of 10 nanometers is deposited on an entire surface of the device by a normal pressure chemical vapor deposition method using monosilane and oxygen at a temperature, for example, 400° C.

Figure 8C:
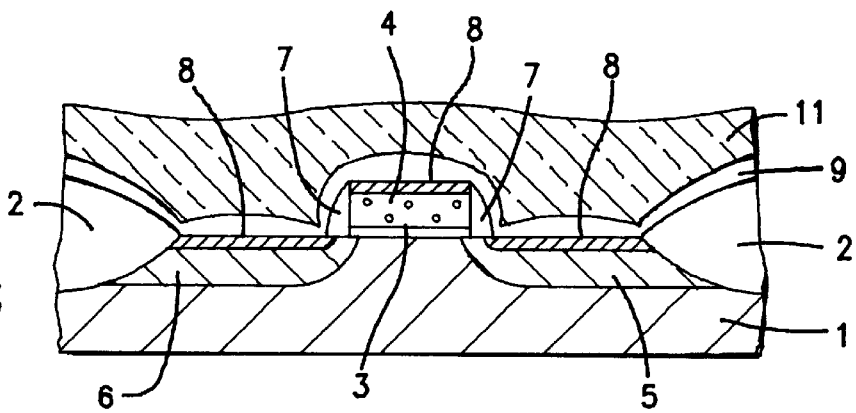

With reference to FIG. 8C, a spin on glass material was prepared from ethoxysilane represented by the chemical formula of $H_3Si(OC_2H_5)$ and added with trimethoxyphosphate represented by the chemical formula of $PO(OC_2H_5)_3$, toluethoxyborate represented by the chemical formula of $B(OC_2H_5)_4$ and tetramethoxy germanium represented by the chemical formula of $Ge(OCH_3)_3$ wherein amounts of trimethoxyphosphate, toluethoxyborate and tetramethoxy germanium were so determined that concentrations of phosphorus, boron and germanium are 7 percents by weight, 3 percents by weight and 20 percents by weight respectively. This spin on glass material was then applied on the silicon oxide film during a rotation of the wafer at a rotation rate of 4000 rpm until the thickness of the spin on glass material becomes approximately 400 nanometers. After this application process, the wafer was subjected to a heat treatment at a temperature of 150° C. for 1 minutes in nitrogen atmosphere on a hot plate in order to volatile the solvent into which ethoxysilane was dissolved. Further, the wafer was subjected to a heat treatment at a temperature of 400° C. for 60 minutes in nitrogen atmosphere in order to form the spin on glass film made of ethoxysilane represented by the chemical formula of $H_3Si(OC_2H_5)$ added with trimethoxyphosphate represented by the chemical formula of $PO(OC_2H_5)_3$, toluethoxyborate represented by the chemical formula of $B(OCH_3)_4$ and tetramethoxy germanium represented by the chemical formula of $Ge(OCH_3)_4$. Furthermore, the wafer was subjected to a heat treatment at a temperature of 800° C. for 30 minutes in nitrogen atmosphere in order to bake the spin on glass material, to thereby form a spin on glass film 12 with no Si—H bonding.

It was confirmed that a difference in level of the surface of the spin on glass film 10 is smaller as compared to the first and second embodiments. It was also confirmed that the spin on glass material buries, without any cavity by a single application process, an aperture between interconnections having a pitch of 0.2 micrometers, wherein the aspect ratio is 1.5.

Figure 9A:
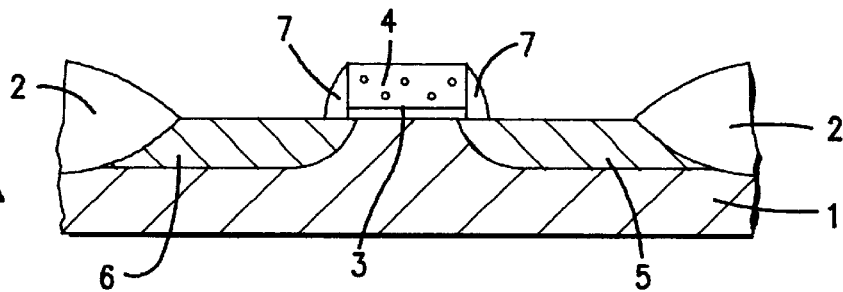
FIGS. 9A through 9C are fragmentary cross sectional elevation views illustrative of semiconductor devices covered by a spin on glass film involved in a fabrication method thereof in a fourth embodiment according to the present invention.

A fourth embodiment according to the present invention will be described in detail with reference to FIGS. 9A through 9C. With reference to FIG. 9A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4.

Figure 9B:
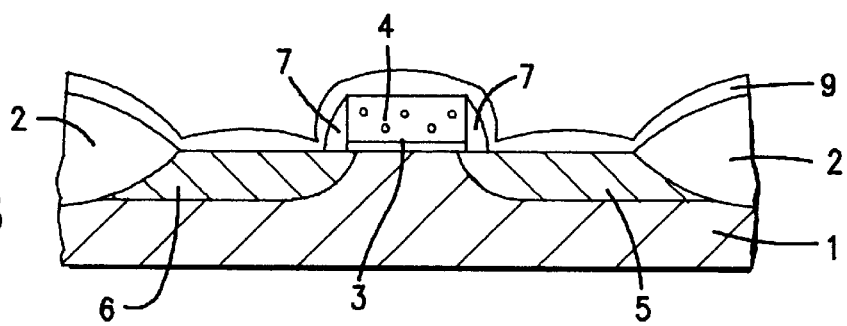

With reference to FIG. 9B, a silicon oxide film 9 having a thickness of 10 nanometers is deposited on an entire surface of the device by a normal pressure chemical vapor deposition method using monosilane and oxygen at a temperature, for example, 400° C.

Figure 9C:
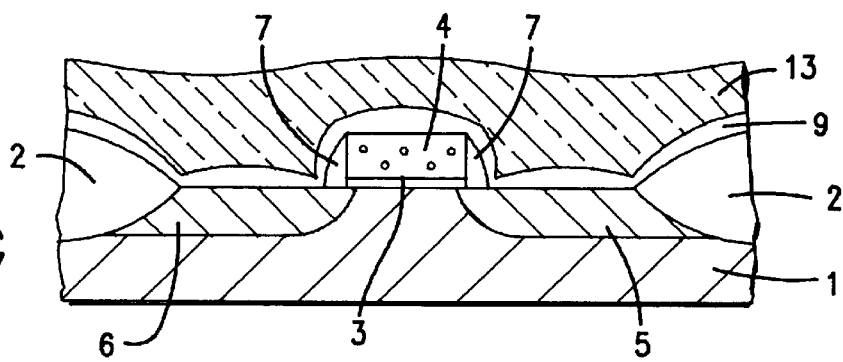

With reference to FIG. 9C, a spin on glass material was prepared from a mixture of ethoxysilane represented by the chemical formula of $H_3Si(OC_2H_5)$ and tetraethoxysilane represented by the chemical formula of $Si(OC_2H_5)_4$, wherein a ratio by weight of ethoxysilane to tetraethoxysilane is 8:2. The spin on glass material was then applied on the silicon oxide film during a rotation of the wafer at a rotation rate of 4000 rpm until the thickness of the spin on glass material becomes approximately 400 nanometers. After this application process, the wafer was subjected to a heat treatment at a temperature of 150° C. for 1 minutes in nitrogen atmosphere on a hot plate in order to volatile the solvent into which ethoxysilane and tetraethoxysilane were dissolved. Further, the wafer was subjected to a heat treatment at a temperature of 400° C. for 60 minutes in nitrogen atmosphere in order to form the spin on glass film made of the mixture of ethoxysilane represented by the chemical formula of $H_3Si(OC_2H_5)$ and tetraethoxysilane represented by the chemical formula of $Si(OC_2H_5)_4$. Furthermore, the wafer was subjected to a heat treatment at a temperature of 800° C. for 30 minutes in nitrogen atmosphere in order to bake the spin on glass material, to thereby form a spin on glass film 13.

It was confirmed that a difference in level of the surface of the spin on glass film 10 is smaller by 30% than the difference in level of the surface of the silicon oxide film 9. It was also confirmed that the spin on glass material buries, without any cavity by a single application process, an aperture between interconnections having a pitch of 0.2 micrometers, wherein the aspect ratio is 1.5.

Figure 10A:
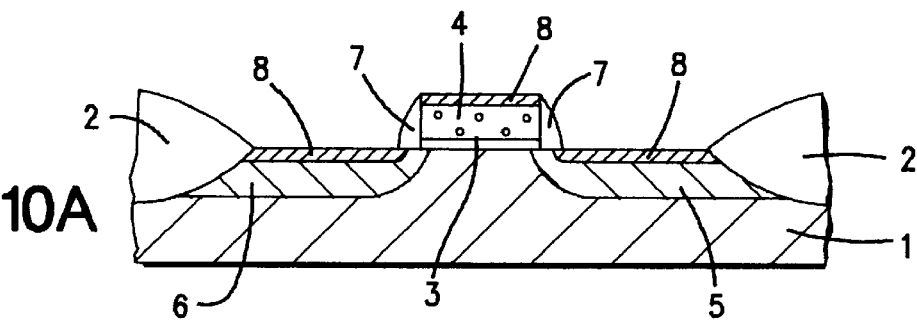
FIGS. 10A through 10C are fragmentary cross sectional elevation views illustrative of semiconductor devices covered by a spin on glass film involved in a fabrication method thereof in a fifth embodiment according to the present invention.

A fifth embodiment according to the present invention will be described in detail with reference to FIGS. 10A through 10C. With reference to FIG. 10A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4. A titanium silicide film 8 is selectively formed on the source and drain diffusion regions 5 and 6 as well as on the gate electrode 4.

Figure 10B:
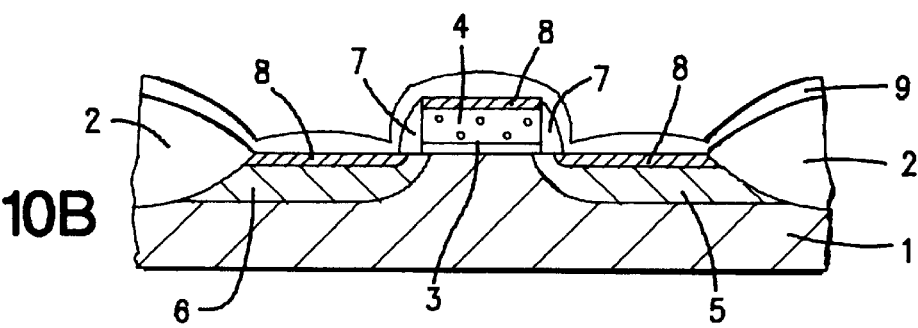

With reference to FIG. 10B, a silicon oxide film 9 having a thickness of 10 nanometers is deposited on an entire surface of the device by a normal pressure chemical vapor deposition method using monosilane and oxygen at a temperature, for example, 400° C.

Figure 10C:
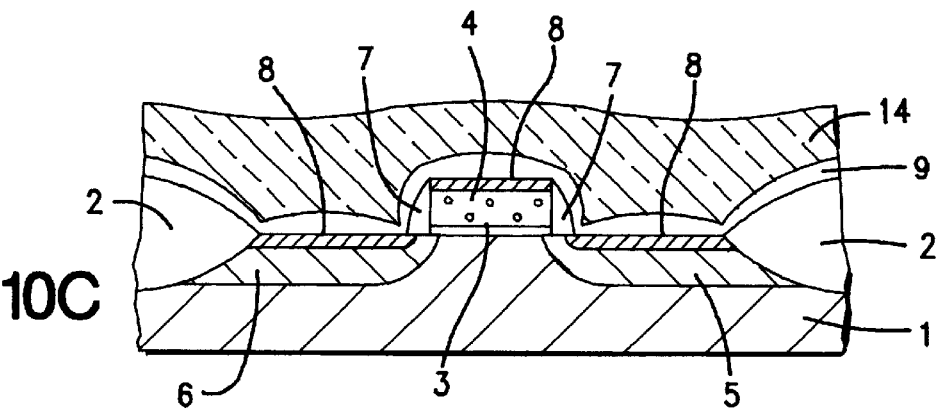

With reference to FIG. 10C, a spin on glass material was prepared from a mixture of ethoxysilane represented by the chemical formula of $H_3Si(OC_2H_5)$ and tetraethoxysilane represented by the chemical formula of $Si(OC_2H_5)_4$, wherein a ratio by weight of ethoxysilane to tetraethoxysilane is 8:2. The above mixture was added with trimethoxyphosphate represented by the chemical formula of $PO(OCH_3)_3$, wherein an amount of the trimethoxyphosphate was so determined that a concentration of phosphorus is 7 percents by weight. This spin on glass material was then applied on the silicon oxide film during a rotation of the wafer at a rotation rate of 4000 rpm until the thickness of the spin on glass material becomes approximately 400 nanometers. After this application process, the wafer was subjected to a heat treatment at a temperature of 150° C. for 1 minutes in nitrogen atmosphere on a hot plate in order to volatile the solvent into which ethoxysilane was dissolved. Further, the wafer was subjected to a heat treatment at a temperature of 400° C. for 60 minutes in nitrogen atmosphere in order to form the spin on glass film made of the mixture of ethoxysilane represented by the chemical formula of $H_3Si(OC_2H_5)$ and tetraethoxysilane represented by the chemical formula of $Si(OC_2H_5)_4$, wherein the above mixture was added with trimethoxyphosphate represented by the chemical formula of $PO(OCH_3)_3$. Furthermore, the wafer was subjected to a heat treatment at a temperature of 800° C. for 30 minutes in nitrogen atmosphere in order to bake the spin on glass material, to thereby form a spin on glass film 14 with no Si—H bonding.

It was confirmed that a difference in level of the surface of the spin on glass film 10 is smaller by 30% than the difference in level of the surface of the silicon oxide film 9. It was also confirmed that the spin on glass material buries, without any cavity by a single application process, an aperture between interconnections having a pitch of 0.1 micrometers, wherein the aspect ratio is 2.

Figure 11A:
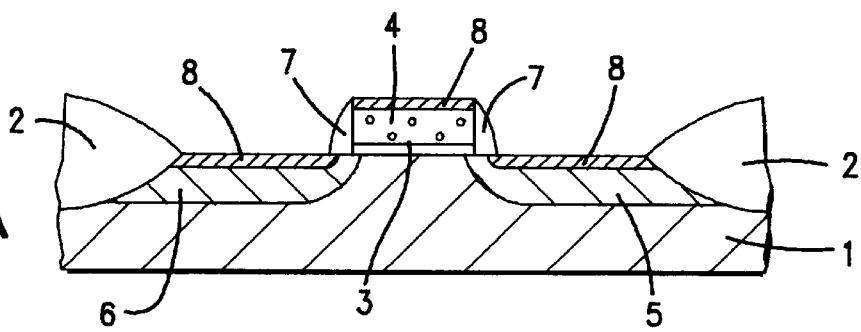
FIGS. 11A through 11C are fragmentary cross sectional elevation views illustrative of semiconductor devices covered by a spin on glass film involved in a fabrication method thereof in a sixth embodiment according to the present invention.

A sixth embodiment according to the present invention will be described in detail with reference to FIGS. 11A through 8C. With reference to FIG. 8A, field oxide films 2 are selectively formed on a surface of a semiconductor substrate 1. Laminations of a gate oxide film 3 and a gate electrode 4 are selectively formed on the semiconductor substrate 1. Source and drain diffusion regions 5 and 6 are formed by ion-implantations with a self-alignment technique. Side wall oxide films 7 are selectively formed at opposite sides of the gate electrode 4. A titanium silicide film 8 is selectively formed on the source and drain diffusion regions 5 and 6 as well as on the gate electrode 4.

Figure 11B:
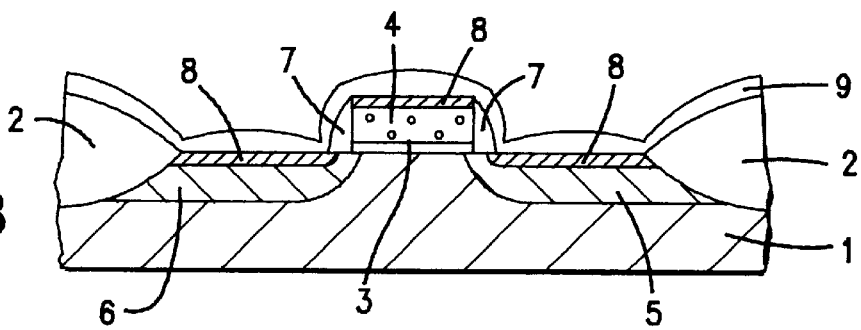

With reference to FIG. 11B, a silicon oxide film 9 having a thickness of 10 nanometers is deposited on an entire surface of the device by a normal pressure chemical vapor deposition method using monosilane and oxygen at a temperature, for example, 400° C.

Figure 11C:
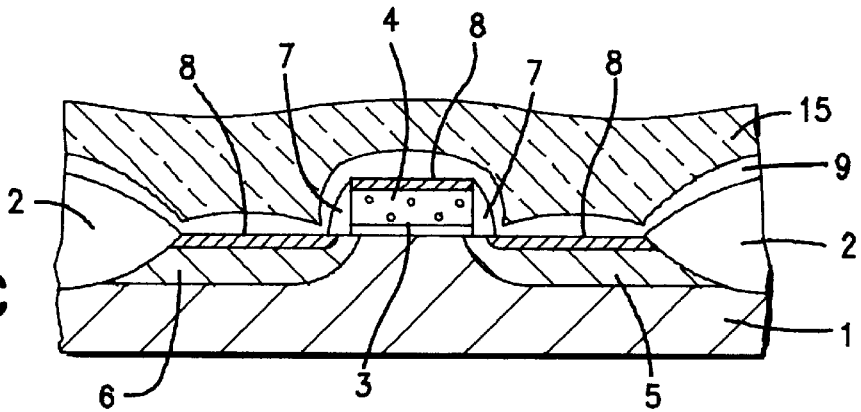

With reference to FIG. 11C, a spin on glass material was prepared from a mixture of ethoxysilane represented by the chemical formula of $H_3Si(OC_2H_5)$ and tetraethoxysilane represented by the chemical formula of $Si(OC_2H_5)_4$, wherein a ratio by weight of ethoxysilane to tetraethoxysilane is 8:2. The above mixture was added with trimethoxyphosphate represented by the chemical formula of $PO(OCH_3)_3$, toluethoxyborate represented by the chemical formula of $B(OC_2H_5)_3$ and tetramethoxy germanium represented by the chemical formula of $Ge(OCH_3)_4$ wherein amounts of trimethoxyphosphate, toluethoxyborate and tetramethoxy germanium were so determined that concentrations of phosphorus, boron and germanium are 7 percents by weight, 3 percents by weight and 20 percents by weight respectively. This spin on glass material was then applied on the silicon oxide film during a rotation of the wafer at a rotation rate of 4000 rpm until the thickness of the spin on glass material becomes approximately 400 nanometers. After this application process, the wafer was subjected to a heat treatment at a temperature of 150° C. for 1 minutes in nitrogen atmosphere on a hot plate in order to volatile the solvent into which ethoxysilane was dissolved. Further, the wafer was subjected to a heat treatment at a temperature of 400° C. for 60 minutes in nitrogen atmosphere in order to form the spin on glass film made of the mixture of ethoxysilane represented by the chemical formula of $H_3Si(OC_2H_5)$ and tetraethoxysilane represented by the chemical formula of $Si(OC_2H_5)_4$. The above mixture was added with trimethoxyphosphate represented by the chemical formula of $PO(OCH_3)_3$, toluethoxyborate represented by the chemical formula of $B(OC_2H_5)_3$ and tetramethoxy germanium represented by the chemical formula of $Ge(OCH_3)_4$. Furthermore, the wafer was subjected to a heat treatment at a temperature of 800° C. for 30 minutes in nitrogen atmosphere in order to bake the spin on glass material, to thereby form a spin on glass film 12 with no Si—H bonding.

It was confirmed that a difference in level of the surface of the spin on glass film 10 is smaller as compared to the foregoing embodiments. It was also confirmed that the spin on glass material buries, without any cavity by a single application process, an aperture between interconnections having a pitch of 0.1 micrometers, wherein the aspect ratio is 2.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to over by claims all modifications which fall within the spirit and scope of the present invention.

What is claimed is:

1. A spin on glass composition comprising:
   an alkoxysilane represented by $H_nSi(OR)_{4-n}$, wherein n is 1, 2, or 3 and R is an alkyl group, said alkoxysilane being dissolved in a solvent; and
   a germanium compound.

2. A spin on glass composition comprising:
   an alkoxysilane represented by $H_nSi(OR)_{4-n}$, wherein n is 1, 2, or 3 and R is an alkyl group, said alkoxysilane being dissolved in a solvent; and
   a trialkoxy-phosphate compound represented by $PO(OR)_3$, wherein R is an alkyl group.

3. A spin on glass composition comprising:
   an alkoxysilane represented by $H_nSi(OR)_{4-n}$, wherein n is 1, 2, or 3 and R is an alkyl group, said alkoxysilane being dissolved in a solvent; and
   a trialkoxy-borate compound represented by $B(OR)_3$, wherein R is an alkyl group.

4. A spin on glass composition comprising:
   an alkoxysilane represented by $H_nSi(OR)_{4-n}$, wherein n is 1, 2, or 3 and R is an alkyl group, said alkoxysilane being dissolved in a solvent; and
   a tetraalkoxy-germanium compound represented by $Ge(OR)_4$, wherein R is an alkyl group.

5. A spin on glass composition comprising:
   an alkoxysilane represented by $H_nSi(OR)_{4-n}$, wherein n is 1, 2, or 3 and R is an alkyl group, said alkoxysilane being dissolved in a solvent; and ethoxysilane represented by $H_3Si(OC_2H_5)$ and trimethoxyphosphate represented by $PO(OCH_3)_3$, with a 7 percent by weight concentration of phosphorus.

6. A spin on glass composition comprising:

an alkoxysilane represented by $H_nSi(OR)_{4-n}$, wherein n is 1, 2, or 3 and R is an alkyl group, said alkoxysilane being dissolved in a solvent; and ethoxysilane represented by $H_3Si(OC_2H_5)$, trimethoxyphosphate represented by $PO(OCH_3)_3$, tetraethoxyborate represented by $B(OC_2H_5)_4$ and tetramethoxy germanium represented by $Ge(OCH_3)_4$, with concentrations of phosphorus, boron and germanium of 7 percent by weight, 3 percent by weight and 20 percent by weight respectively.

7. A spin on glass composition comprising:

an alkoxysilane represented by $H_nSi(OR)_{4-n}$, wherein n is 1, 2, or 3 and R is an alkyl group, said alkoxysilane being dissolved in a solvent; and a mixture of ethoxysilane represented by $H_3Si(OC_2H_5)$ and tetraethoxysilane represented by $Si(OC_2H_5)_4$ with a ratio by weight of ethoxysilane to tetraethoxysilane of 8:2.

8. The spin on glass composition as claimed in claim 7, wherein said mixture further comprises trimethoxyphosphate represented by $PO(OCH_3)_3$ with a 7 percent by weight concentration of phosphorus.

9. The spin on glass composition as claimed in claim 7, wherein said mixture further comprises trimethoxyphosphate represented by $PO(OC_2H_5)_3$, tetraethoxyborate represented by $B(OC_2H_5)_4$ and tetramethoxy germanium represented by $Ge(OCH_3)_4$, with concentrations of phosphorus, boron and germanium of 7 percent by weight, 3 percent by weight and 20 percent by weight respectively.

10. A method for preparing a spin on glass composition comprising the steps of:

dissolving alkoxysilane represented by $H_nSi(OR)_{4-n}$, wherein n is 1, 2, or 3 and R is an alkyl group, in a solvent, and dissolving a germanium compound in said solvent.

11. A method for preparing a spin on glass composition comprising the steps of:

dissolving alkoxysilane represented by $H_nSi(OR)_{4-n}$, wherein n is 1, 2, or 3 and R is an alkyl group, in a solvent, and dissolving a trialkoxy-phosphate compound represented by $PO(OR)_3$, wherein R is an alkyl group, in said solvent.

12. A method for preparing a spin on glass composition comprising the steps of:

dissolving alkoxysilane represented by $H_nSi(OR)_{4-n}$, wherein n is 1, 2, or 3 and R is an alkyl group, in a solvent, and dissolving a trialkoxy-borate compound represented by $B(OR)_3$, wherein R is an alkyl group, in said solvent.

13. A method for preparing a spin on glass composition comprising the steps of:

dissolving alkoxysilane represented by $H_nSi(OR)_{4-n}$, wherein n is 1, 2, or 3 and R is an alkyl group, in a solvent, and dissolving a tetraalkoxy-germanium compound represented by $Ge(OR)_4$, wherein R is an alkyl group, in said solvent.

14. A method for preparing a spin on glass composition comprising the step of:

dissolving alkoxysilane represented by $H_nSi(OR)_{4-n}$, wherein n is 1, 2, or 3 and R is an alkyl group, in a solvent, wherein said solvent comprises ethoxysilane represented by $H_3Si(OC_2H_5)$ and trimethoxyphosphate represented by $PO(OCH_3)_3$ with a concentration of phosphorus of 7 percent by weight.

15. A method for preparing a spin on glass composition comprising the steps of:

dissolving alkoxysilane represented by $H_nSi(OR)_{4-n}$, wherein n is 1, 2, or 3 and R is an alkyl group, in a solvent; and dissolving ethoxysilane represented by $H_3Si(OC_2H_5)$, trimethoxyphosphate represented by $PO(OC_2H_5)_3$, tetraethoxyborate represented by $B(OC_2H_5)_4$ and tetramethoxy germanium represented by $Ge(OCH_3)_4$, with concentrations of phosphorus, boron and germanium of 7 percent by weight, 3 percent by weight, and 20 percent by weight respectively, in said solvent.

16. A method for preparing a spin on glass composition comprising the steps of:

dissolving alkoxysilane represented by $H_nSi(OR)_{4-n}$, wherein n is 1, 2, or 3 and R is an alkyl group, in a solvent, and dissolving in said solvent a mixture of ethoxysilane represented by $H_3Si(OC_2H_5)$ and tetraethoxysilane represented by $Si(OC_2H_5)_4$ with a ratio by weight of ethoxysilane to tetraethoxysilane of 8:2.

17. The method as claimed in claim 16, further comprising the step of dissolving in said solvent trimethoxyphosphate represented by $PO(OCH_3)_3$, with a concentration of 7 percent by weight phosphorus.

18. The method as claimed in claim 16, further comprising the step of dissolving in said solvent trimethoxyphosphate represented by $PO(OC_2H_5)_3$, tetraethoxyborate represented by $B(OC_2H_5)_4$ and tetramethoxy germanium represented by $Ge(OCH_3)_4$, wherein concentrations of phosphorus, boron and germanium are 7 percent by weight, 3 percent by weight and 20 percent by weight respectively.

* * * * *